(12) United States Patent
Yasui et al.

(10) Patent No.: US 8,632,905 B2
(45) Date of Patent: Jan. 21, 2014

(54) BATTERY MODULE AND BATTERY PACK

(75) Inventors: Shunsuke Yasui, Osaka (JP); Hiroshi Takasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/393,751

(22) PCT Filed: Jul. 26, 2011

(86) PCT No.: PCT/JP2011/004202
§ 371 (c)(1),
(2), (4) Date: Mar. 1, 2012

(87) PCT Pub. No.: WO2012/081140
PCT Pub. Date: Jun. 21, 2012

(65) Prior Publication Data
US 2012/0270097 A1    Oct. 25, 2012

(30) Foreign Application Priority Data

Dec. 13, 2010  (JP) ................................. 2010-276485

(51) Int. Cl.
*H01M 2/18* (2006.01)
(52) U.S. Cl.
USPC ........................... 429/160; 429/130; 429/131
(58) Field of Classification Search
USPC ....................................................... 429/160
See application file for complete search history.

(56) References Cited

U.S. PATENT DOCUMENTS

| 2006/0246350 A1 | 11/2006 | Takayama et al. |
| 2009/0017367 A1 | 1/2009 | Marubayashi |

FOREIGN PATENT DOCUMENTS

| JP | 2006-120489 | 5/2006 |
| JP | 2007-026894 | 2/2007 |
| JP | 2008-300083 | 12/2008 |

OTHER PUBLICATIONS

International Search Report issued in International Patent Application No. PCT/JP2011/004202 dated Aug. 30, 2011.

*Primary Examiner* — Barbara Gilliam
*Assistant Examiner* — Gary Harris
(74) *Attorney, Agent, or Firm* — McDermott Will & Emery LLP

(57) ABSTRACT

A battery module 100 includes a plurality of cells aligned and accommodated in a case 10, wherein a positive electrode external terminal 20 and a negative electrode external terminal 21 which are connected to electrodes of the plurality of cells are disposed in parallel on a first side surface 11 of the case 10 at a predetermined interval, a pair of recessed sections 30, 31 are formed on a second side surface 12 adjacent to the first side surface 11 of the case 10 at a same interval as the predetermined interval, a first portion 51 of an L-shaped electrode piece 50 is selectively attachable to the positive electrode external terminal 20 or the negative electrode external terminal 21, and a second portion 52 of the electrode piece 50 is selectively attachable to any one of the pair of recessed sections 30, 31.

10 Claims, 7 Drawing Sheets

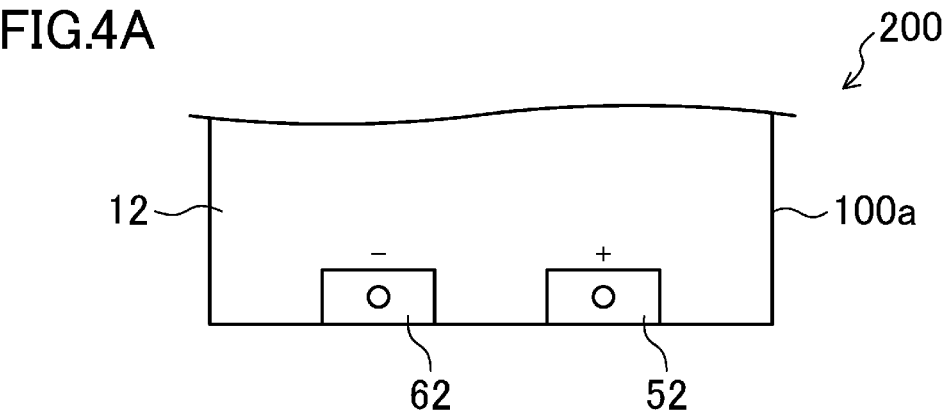
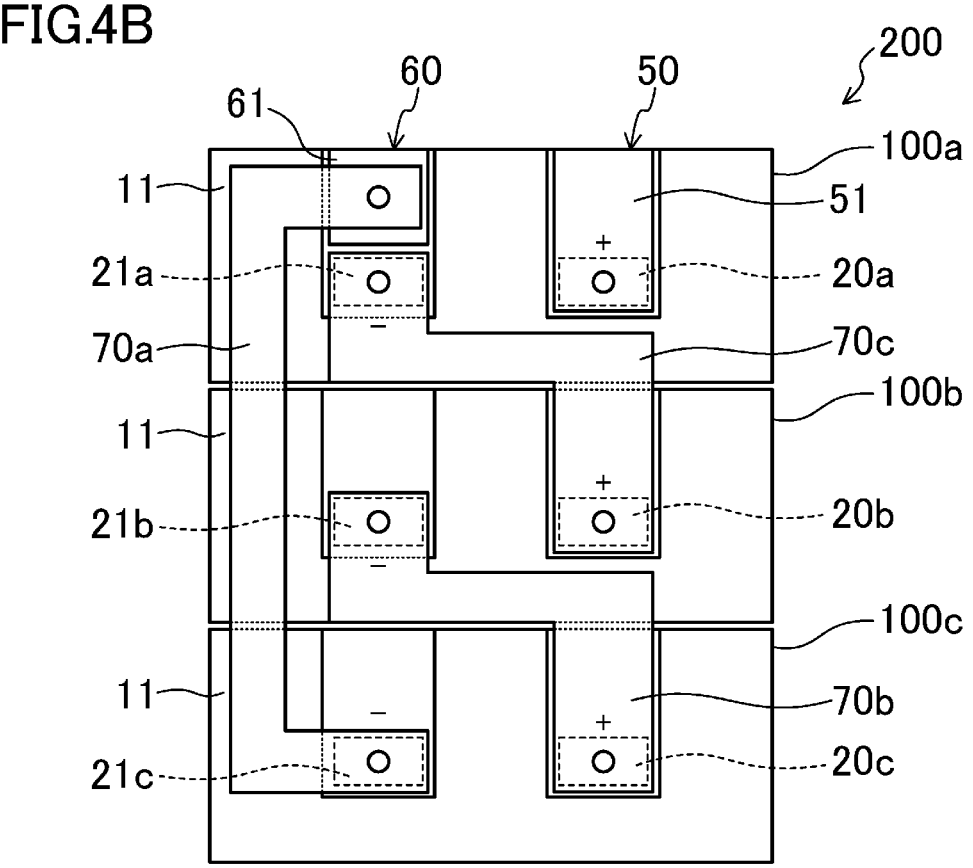

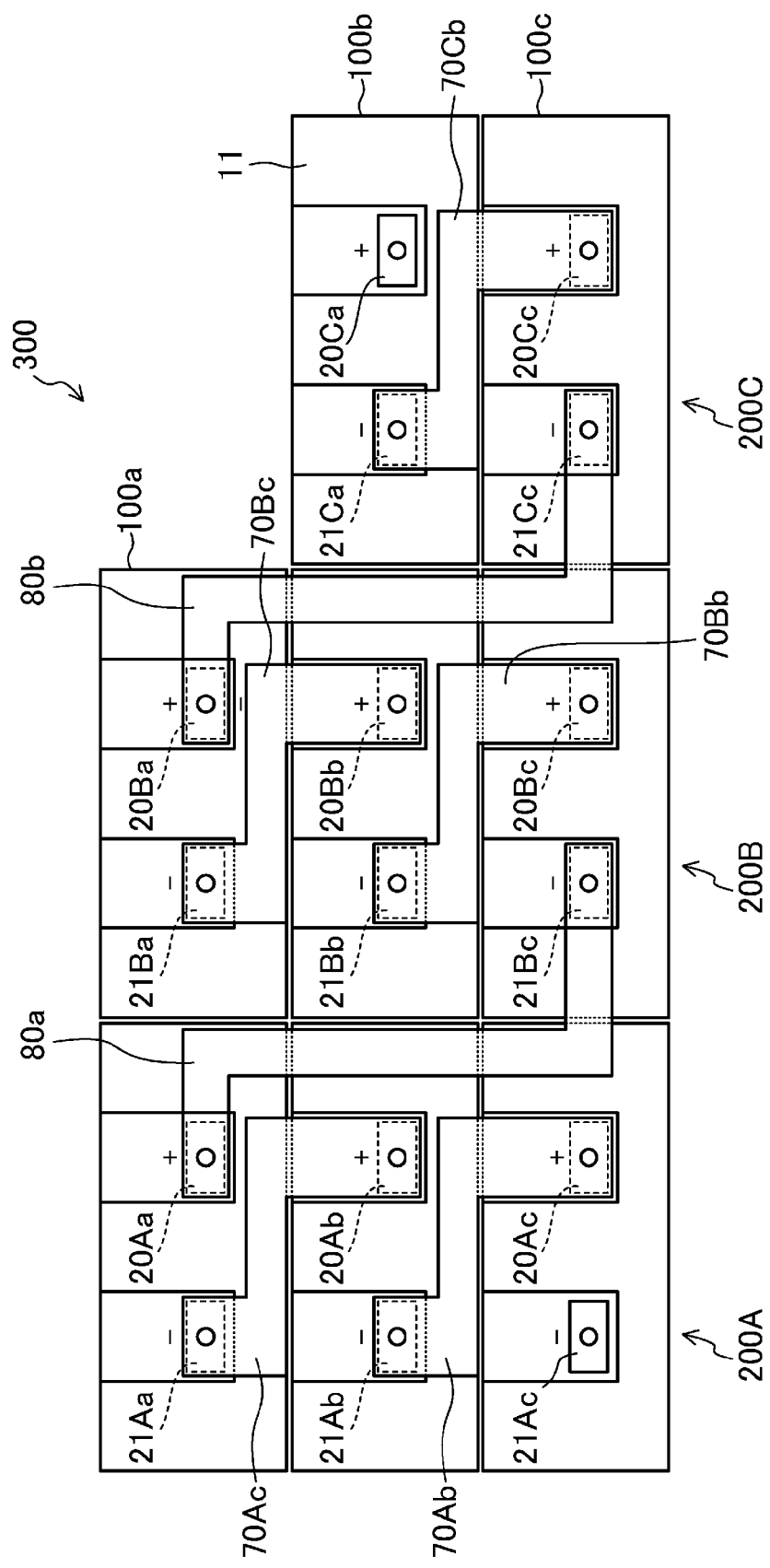

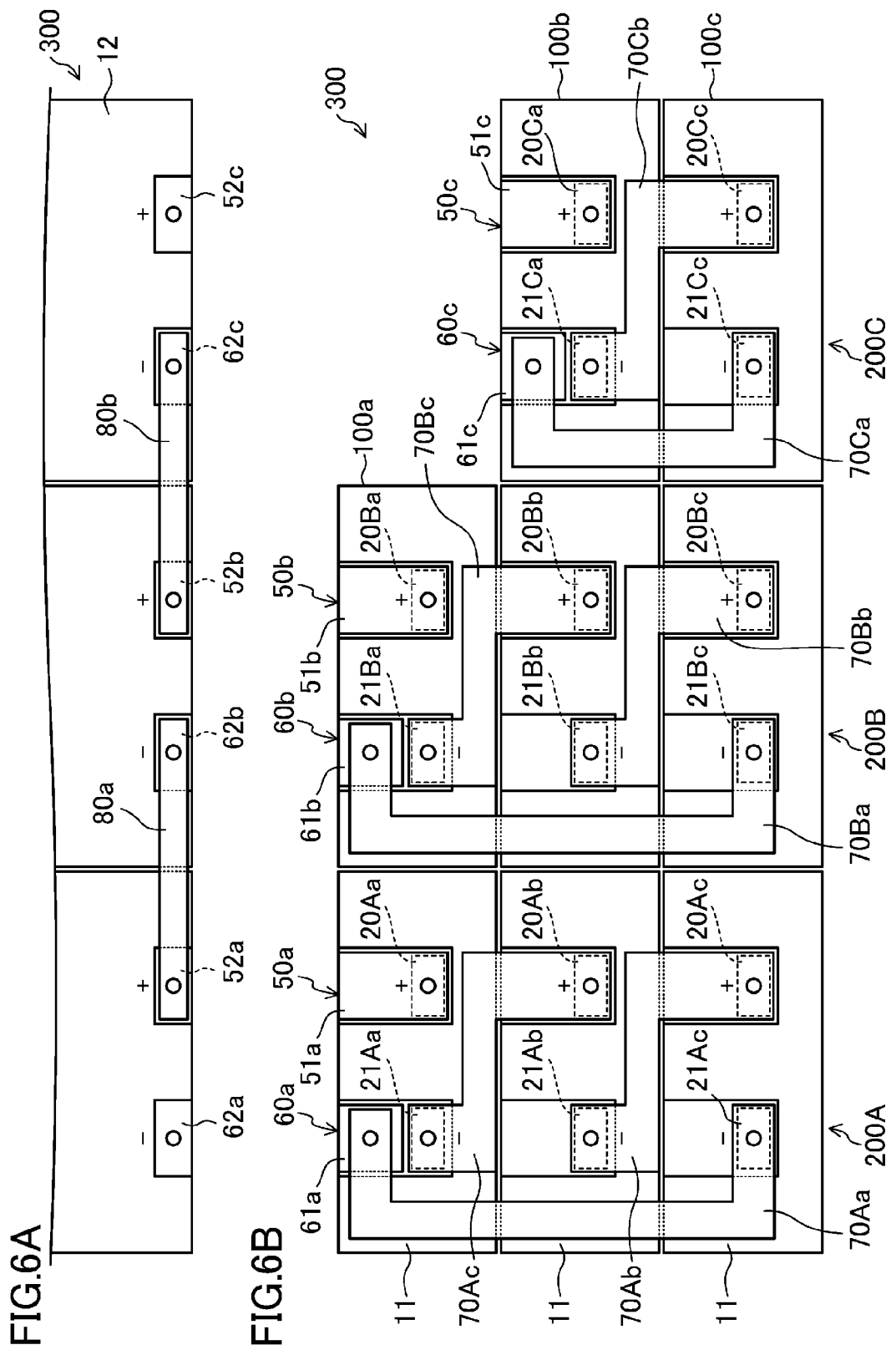

BATTERY MODULE AND BATTERY PACK

RELATED APPLICATIONS

This application is the U.S. National Phase under 35 U.S.C. §371 of International Application No. PCT/JP2011/004202, filed on Jul. 26, 2011, which in turn claims the benefit of Japanese Application No. 2010-276485, filed on Dec. 13, 2010, the disclosures of which Applications are incorporated by reference herein.

TECHNICAL FIELD

The present invention relates to battery modules including a plurality of batteries, and to battery packs formed by stacking the battery modules.

BACKGROUND ART

Battery packs including a plurality of batteries accommodated in a case to allow an output of a predetermined voltage and capacitance are widely used as power sources of various devices, vehicles, etc. Specifically, the technique of forming modules of battery assemblies obtained by connecting general-purpose batteries in parallel and/or in series to output a predetermined voltage and capacitance, and combining the battery modules together to be applicable to various applications is beginning to be used. This module forming technique can reduce the size and weight of the battery modules themselves by increasing the performance of batteries accommodated in the battery modules. Thus, this module forming technique has various advantages, an example of which is that workability can be improved in assembling a battery pack, and the flexibility in mounting the battery module in areas of limited space, such as a vehicle, can be increased.

Generally, a battery module includes a plurality of batteries accommodated in a battery case, wherein wires electrically connecting electrodes of the batteries to each other in series or in parallel are connected to external terminals attached to a side surface of the battery case (for example, see Patent Document 1). When a battery pack is formed by aligning multiple ones of the battery module, the external terminals each disposed on a side surface of the battery module are electrically connected to each other in series or in parallel, so that the battery pack having a predetermined voltage and capacity can be obtained.

CITATION LIST

Patent Document

PATENT DOCUMENT 1: Japanese Patent Publication No. 2007-026894

SUMMARY OF THE INVENTION

Technical Problem

The battery module has a predetermined outside dimension, and the position of the external terminal of the battery module is predetermined. Thus, a battery pack can be easily assembled by aligning a necessary number of battery modules. Here, the battery modules are aligned with their external terminals facing in the same direction, so that the battery modules are easily electrically connected to each other.

Moreover, the thus assembled battery pack is generally accommodated in a pack case, which is installed in predetermined space. Here, since the external terminals are aligned to face in the same direction, maintenance such as connecting the external terminals can be performed by opening a side surface of the battery pack which is close to the aligned external terminals even in a state in which the battery pack is installed in predetermined space.

However, once the pack case accommodating the battery pack has been installed in predetermined space, the side surface of the pack case which is close to the aligned external terminals cannot be opened in some cases due to space limitations, etc. In this case, maintenance, etc. cannot be performed with the pack case being in the installed state, and thus the pack case has to be temporarily taken out of the installation location to perform the maintenance.

Moreover, in order to allow maintenance, etc. with the battery pack being in the installed state, arranging the battery modules with the external terminals facing an openable side surface of the pack case is a prerequisite. This may limit the degree of freedom in aligning the battery modules.

In view of the foregoing, the present invention was devised. It is an objective of the present invention to provide a battery module, the maintenance of which is made easier, and which has a high degree of freedom in arrangement, and a battery pack formed by stacking multiple ones of the battery module.

Solution to the Problem

To achieve the above objective, the present invention uses a configuration of a battery module including a plurality of cells (batteries used in a battery module are hereinafter referred to as "cells") accommodated in a case, wherein an external terminal is disposed on a side surface of the case, a recessed section is formed on a side surface adjacent to the side surface provided with the external terminal, one portion of an L-shaped electrode piece is attachable to the external terminal, and the other portion of the L-shaped electrode piece is attachable to the recessed section.

With this configuration, when multiple ones of the battery module are stacked to form a battery pack, the one portion of the electrode piece is attached to the external terminal of the battery module at an uppermost level, and the other portion of the electrode piece is attached to the recessed section of the battery module at the uppermost level. In this way, the external terminal of the battery module can be disposed on two adjacent side surfaces of the case. Thus, a work plane for connecting the external terminals to each other can be ensured on the two side surfaces of the case, so that the maintenance can be made easier, and the degree of freedom in arranging the battery modules to form a battery pack can be increased.

A battery module according to the present invention includes a plurality of cells aligned and accommodated in a case, wherein a positive electrode external terminal and a negative electrode external terminal which are connected to electrodes of the plurality of cells are disposed in parallel on a first side surface of the case at a predetermined interval, a pair of recessed sections are formed on a second side surface adjacent to the first side surface of the case at a same interval as the predetermined interval, and a first portion of an L-shaped electrode piece is selectively attachable to the positive electrode external terminal or the negative electrode external terminal, and a second portion of the electrode piece is selectively attachable to any one of the pair of recessed sections.

Moreover, a battery pack according to the present invention includes multiple ones of the battery module of claim 1 stacked in a direction perpendicular to the second side surface, wherein the first portion of the electrode piece is attached to one of the positive electrode external terminal or the negative electrode external terminal which is disposed on the first side surface of the case of the battery module at an uppermost level, the second portion of the electrode piece is attached to one of the pair of recessed sections formed on the second side surface of the case of the battery module at the uppermost level, and the second portion of the electrode piece serves as an external terminal of one of electrodes of the battery pack.

Advantages of the Invention

According to the present invention, a battery module, the maintenance of which is made easier, and which has a high degree of freedom in the arrangement can be obtained, and maintenance of a battery pack formed by stacking multiple ones of the battery module can be made easier, and the degree of freedom in arranging the battery modules to form the battery pack can be improved.

BRIEF DESCRIPTION OF THE DRAWINGS

[FIG. 1]

FIG. 2 is a perspective view illustrating a configuration in which the L-shaped electrode piece is attached to the battery module of FIG. 1.

FIG. 3 is a perspective view schematically illustrating a configuration of a battery pack formed by stacking multiple ones of the battery module.

[FIG. 4] FIGS. 4A, 4B are views illustrating a configuration of the battery pack in which the battery modules are electrically connected to each other, where FIG. 4A is a plan view, and FIG. 4B is a front view.

[FIG. 5] FIG. 5 is a front view illustrating an example of a power supply unit obtained by aligning battery packs each formed by stacking multiple ones of the battery module of FIG. 1A.

[FIG. 6] FIGS. 6A, 6B are views illustrating a configuration of the power supply unit of FIG. 5 with L-shaped electrode pieces and second electrode pieces being attached to the battery modules, where FIG. 6A is a plan view, and FIG. 6B is a front view.

[FIG. 7] FIGS. 7A, 7B are views illustrating an example of a battery pack configured by arranging battery modules in parallel, wherein FIG. 7A is a plan view, and FIG. 7b is a front view.

DESCRIPTION OF EMBODIMENTS

Embodiments of the present invention will be described in detail below with reference to the drawings. The present invention is not limited to the following embodiments. The embodiment can be modified without deviating from the effective scope of the present invention. The embodiment can be combined with other embodiments.

Figure 1A:
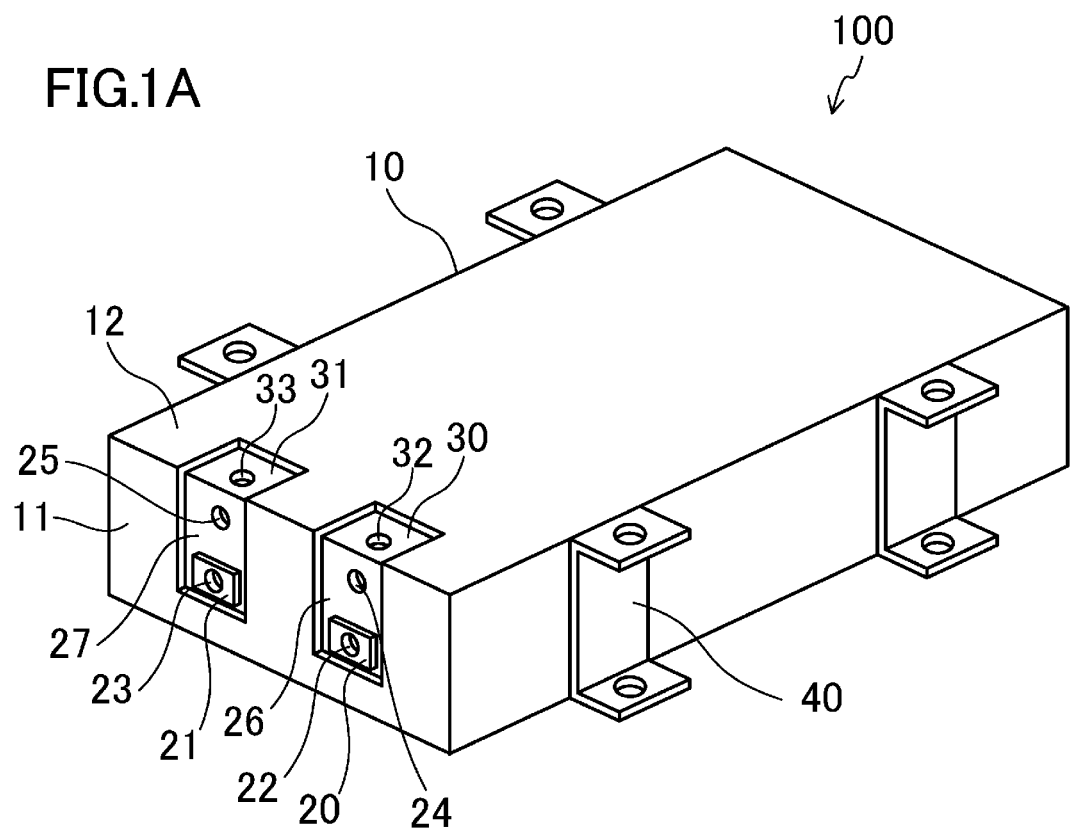
FIG. 1A is a perspective view schematically illustrating a configuration of a battery module of an embodiment of the present invention.

FIG. 1A is a perspective view schematically illustrating a configuration of a battery module 100 of an embodiment of the present invention. The battery module 100 includes a plurality of cells (not shown) aligned and accommodated in a case 10. Note that the type of the cells used in the battery module of the present invention is not particularly limited, and for example, lithium-ion batteries, nickel-hydrogen batteries, etc. may be used. Alternatively, a battery which can be used alone as a power source of portable electronic devices such as lap top computers, etc. may be used. In this case, general-purpose batteries having high power can be used as cells in the battery module, so that the performance of the battery module can be more easily increased, and the cost of the battery module can be more easily reduced.

As illustrated in FIG. 1A, a positive electrode external terminal 20 and a negative electrode external terminal 21 which are connected to electrodes of the plurality of cells are disposed in parallel at a predetermined interval on a first side surface 11 of the case 10. Note that the cells may be electrically connected to each other in series or in parallel. Moreover, an electrical interconnect structure between the cells is not particularly limited, and for example, for a parallel connection, the cells are arranged so that their electrodes having the same polarity are on the same side, and the electrodes of one polarity are connected to each other by a bus bar, and the electrodes of the other polarity are connected to each other by a bus bar.

Figure 1B:
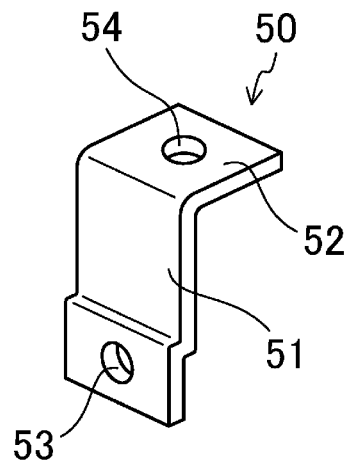
FIG. 1B is a perspective view illustrating a configuration of an L-shaped electrode piece.

On a second side surface 12 adjacent to the first side surface 11 of the case 10, a pair of recessed sections 30, 31 is formed at the same interval as that between the external terminals 20, 21. A first portion 51 of an L-shaped electrode piece 50 as illustrated in FIG. 1B is selectively attachable to the positive electrode external terminal 20 or the negative electrode external terminal 21, and a second portion 52 of the electrode piece 50 is selectively attachable one of the pair of recessed sections 30, 31.

Figure 2:
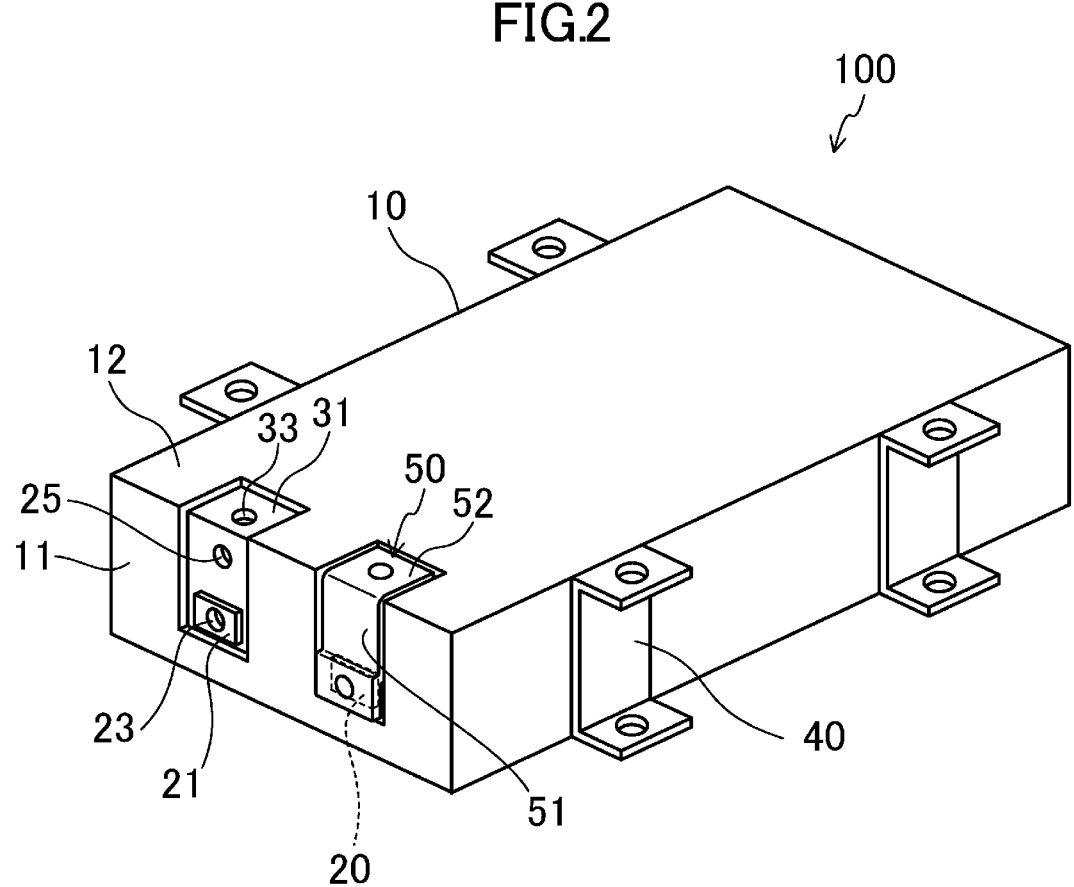
[FIG. 2]

That is, as illustrated in FIG. 2, when the first portion 51 of the L-shaped electrode piece 50 is attached to, for example, the positive electrode external terminal 20, and the second portion 52 is attached to the recessed section 30, this means that the positive electrode external terminal is disposed on the two adjacent side surfaces 11, 12 of the case 10.

Here, the L-shaped electrode piece 50 does not necessarily have a shape which is bent to a right angle, but may be accordingly deformed to conform to the shape of the external terminals 20, 21 and the recessed sections 30, 31. Moreover, a material for the electrode piece 50 is not particularly limited, and for example, copper, aluminum, nickel, a clad material containing copper and nickel, or the like may be accordingly used.

Note that as illustrated in FIG. 2, the second portion 52 of the electrode piece 50 is configured to be filled in and attached to the recessed section 30, 31. Thus, when the depth of the recessed sections 30, 31 is the same as the thickness of the electrode piece 50, the second portion 52 of the electrode piece 50 attached to the recessed section 30, 31 does not protrude beyond the second side surface 12 of the case 10. Therefore, multiple ones of the battery modules 100 can be stably stacked in a direction perpendicular to the second side surface 12 of the case 10.

Moreover, when a pair of second recessed sections 26, 27 configured to be filled with the first portion 51 of the electrode piece 50 is also formed on the first side surface 11 of the case 10, the first portion 51 of the electrode piece 50 is filled in and attached to the recessed section 26, 27.

Moreover, when bolt holes (or screw holes) 32, 33, and 54 are respectively formed in the pair of recessed sections 30, 31 and the second portion 52 of the electrode piece 50, the second portion 52 of the electrode piece 50 is attachable to the pair of recessed sections 30, 31 by a bolt (or a screw). Note that a method for attaching the electrode piece 50 is not limited to the above-described method, but other methods may be used as long as the methods allow detachable attachment.

Likewise, when bolt holes (or screw holes) 22, 23 and 53 are respectively formed in the external terminals 20, 21 and the first portion 51 of the electrode piece 50, the first portion 51 of the electrode piece 50 is attachable to the external terminals 20, 21 by a bolt (or a screw).

Moreover, the case 10 is provided with joints 40, so that when multiple ones of the battery module 100 are stacked, the battery modules 100 adjacent to each other can be jointed via the joints 40.

Figure 3:
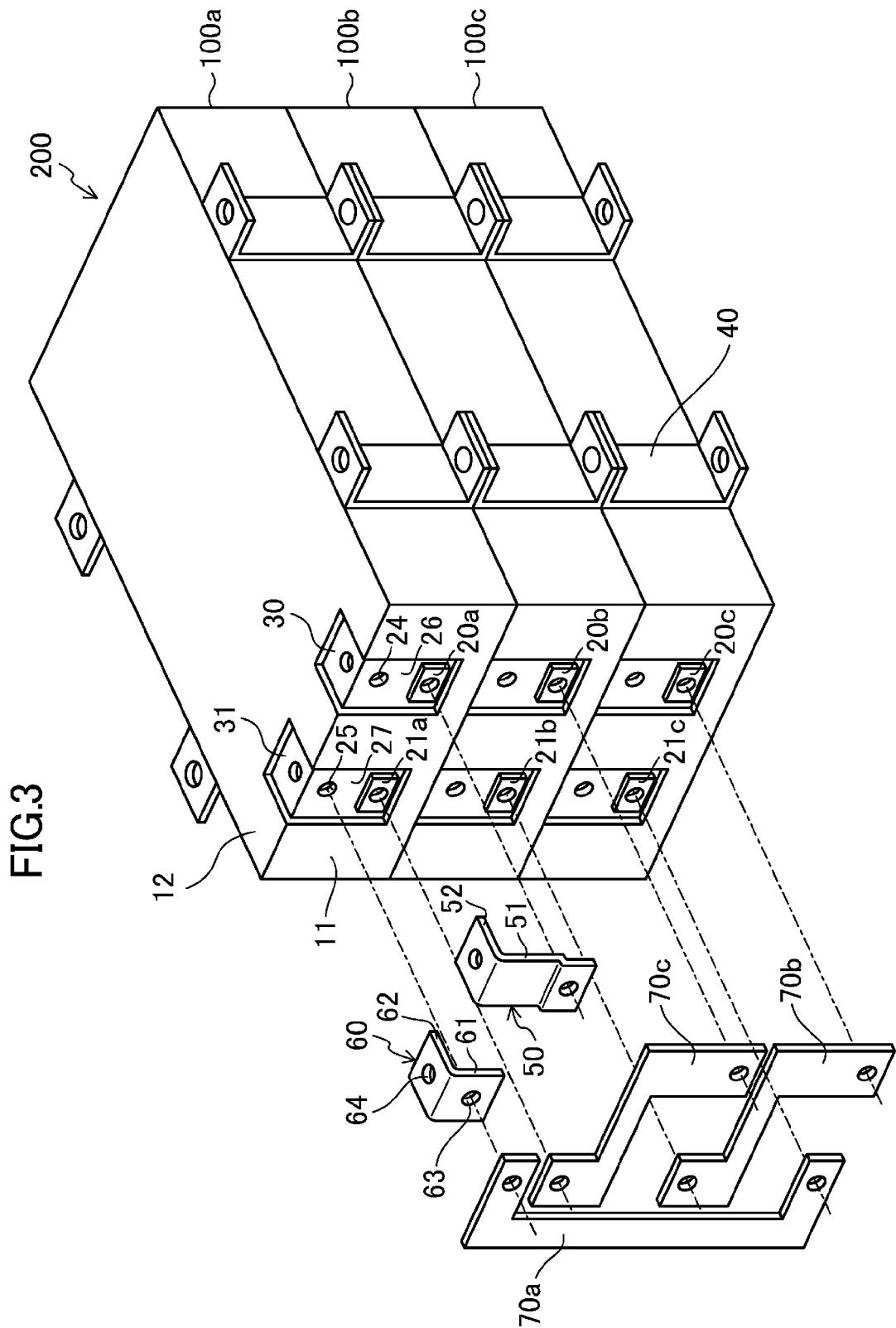
[FIG. 3]

FIG. 3 is a perspective view schematically illustrating a configuration of a battery pack 200 formed by stacking multiple ones of the battery module 100 (three battery modules in the figure) in a direction perpendicular to the second side surface 12 of the case 10.

As illustrated in FIG. 3, first, the first portion 51 of the electrode piece 50 is attached to one of a positive electrode external terminal 20a or a negative electrode external terminal 21a (a positive electrode external terminal 20a in the present embodiment) disposed on a first side surface 11 of a case 10 of a battery module 100a at an uppermost level, and the second portion 52 of the electrode piece 50 is attached to one of a pair of recessed sections 30, 31 (a recessed section 30 in the present embodiment) formed on a second side surface 12 of the case 10. With this configuration, the second portion 52 of the electrode piece 50 serves as an external terminal of one of electrodes of the battery pack 200 (a positive electrode in the present embodiment).

Moreover, a second portion 62 of an L-shaped second electrode piece 60 is attached to the other of the pair of recessed sections 30, 31 (the recessed section 31 in the present embodiment), and a first portion 61 of the second electrode piece 60 is attached to one of a pair of second recessed sections 26, 27 (a recessed section 27 in the present embodiment) formed on the first side surface 11 of the case 10. Moreover, the first portion 61 of the second electrode piece 60 is connected to a negative electrode external terminal 21c of a battery module 100c at a lowermost level via a bus bar 70a disposed on a side close to the first side surface 11 of the case 10. With this configuration, the second portion 62 of the second electrode piece 60 serves as an external terminal of the other of the electrodes of the battery pack 200 (a negative electrode in the present embodiment).

Here, when the electrode piece 50 is compared with the second electrode piece 60, the second portions 52, 62 which are filled in the pair of recessed sections 30, 31 are substantially the same size, whereas the length of the portion 61 of the second electrode piece 60 is smaller than the length of the first portion 51 of the electrode piece 50. That is, the second electrode piece 60 does not have the function of disposing the external terminal 20, 21 on the two adjacent side surfaces 11, 12 of the case 10.

Note that when bolt holes (or screw holes) 63, 64, 24, and 25 are respectively formed in the first and the second portions 61, 62 of the second electrode piece 60 and the pair of second recessed sections 26, 27, the first and the second portions 61, 62 of the second electrode piece 60 are attachable to the recessed section 30 and the second recessed section 26, respectively, or to the recessed section 31 and the second recessed section 27, respectively by bolts (or screws).

Moreover, positive electrode external terminals 20a, 20b, 20c and negative electrode external terminals 21a, 21b, 21c of the stacked battery modules 100a, 100b, 100c are connected via a plurality of bus bars 70b, 70c disposed on the side close to the first side surfaces 11 of the cases 10.

For example, in the example illustrated in FIG. 3, the positive electrode external terminal 20c of the battery module 100c at the lowermost level is connected to the negative electrode external terminal 21b of the battery module 100b at an intermediate level via the bus bar 70b. Moreover, the positive electrode external terminal 20b of the battery module 100b at the intermediate level is connected to the negative electrode external terminal 21a of the battery module 100a at the uppermost level via the bus bar 70c.

FIGS. 4A, 4B are views illustrating a configuration of the battery pack 200 having the above-described connection, where FIG. 4A is a plan view, and FIG. 4B is a front view.

As illustrated in FIG. 4B, the battery modules 100a, 100b, 100c are electrically connected to each other in series. The positive electrode external terminal 20a of the battery module 100a at the uppermost level and the negative electrode external terminal 21c of the battery module 100c at the lowermost level serve as the positive and negative external terminals of the battery pack 200, respectively.

Moreover, as illustrated in FIG. 4A, the second portion 52 of the electrode piece 50 attached to the second side surface 12 of the case 10 is connected to the positive electrode external terminal 20a of the battery module 100a via the L-shaped electrode piece 50. Moreover, the second portion 62 of the second electrode piece 60 attached to the second side surface 12 of the case 10 is connected to the negative electrode external terminal 21c of the battery module 100c via the L-shaped second electrode piece 60 and the bus bar 70a. Thus, the second portion 52 of the electrode piece 50 and the second portion 62 of the second electrode piece 60 which are disposed on the second side surface 12 of the case 10 serve as the positive and negative external terminals of the battery pack 200, respectively.

That is, with this configuration of the battery pack 200, the positive and negative external terminal can be disposed not only on the first side surface 11 of the case 10 but also on the second side surface 12 adjacent to the first side surface 11.

Note that neither the electrode piece 50 nor the second electrode piece 60 is attached to the battery modules 100b, 100c at lower levels. Thus, attaching the electrode piece 50 and the second electrode piece 60 before stacking the battery modules 100b, 100c is no longer a prerequisite, so that the assembly process of the battery pack 200 is not complicated. Moreover, neither the electrode piece 50 nor the second electrode piece 60 is provided between the battery modules 100a, 100b, 100c, so that the battery modules can be stably stacked.

FIG. 5 is a front view illustrating an example of a power supply unit 300 obtained by aligning battery packs 200A, 200B, 200C each formed by stacking multiple ones of the battery module 100 of FIG. 1A.

The battery packs 200A, 200B are each formed by stacking and electrically connecting battery modules 100a, 100b, 100c in series. The battery pack 200C is formed by stacking and electrically connecting battery modules 100b, 100c in series. Thus, the battery packs 200A, 200B, 200C have positive electrode external terminals 20Aa, 20Ba, 20Ca, respectively, and negative electrode external terminals 21Ac, 21Bc, 21Cc, respectively.

Here, when the battery pack 200A, 200B, 200C are electrically connected to each other in series to form the power supply unit 300, as illustrated in FIG. 5, the positive electrode external terminal 20Aa of the battery pack 200A may be connected to the negative electrode external terminal 21Bc of the battery pack 200B via a bus bar 80a, and the positive electrode external terminal 20Ba of the battery pack 200B may be connected to the negative electrode external terminal 21Cc of the battery pack 200C via a bus bar 80b. That is, all these connections can be implemented on a side close to the first side surfaces 11 of the cases 10.

FIGS. 6A, 6B are views illustrating a configuration of the power supply unit 300 of FIG. 5 with L-shaped electrode pieces 50 and second electrode pieces 60 being attached as illustrated in FIGS. 4A, 4B to the battery modules 100a, 100a, 100b at the uppermost level respectively of the battery packs 200A, 200B, 200C, where FIG. 6A is a plan view, and FIG. 6B is a front view.

For example, a second portion 52a of an electrode piece 50a attached to the second side surface 12 of the case 10 of the battery pack 200A is connected to the positive electrode external terminal 20Aa of the battery module 100a via a first portion 51a. Moreover, a second portion 62a of a second electrode piece 60a attached to the second side surface 12 of the case 10 is connected to the negative electrode external terminal 21Ac of the battery module 100c via a first portion 61a and a bus bar 70Aa. Thus, the second portion 52a of the electrode piece 50a and the second portion 62a of the second electrode piece 60a which are disposed on the second side surface 12 of the case 10 serve as positive and negative external terminals of the battery pack 200A, respectively.

By connection in a similar manner, second portions 52b, 62b and 52c, 62c of electrode pieces 50b, 50c and second electrode pieces 60b, 60c which are disposed on the second side surfaces 12 of the cases 10 serve as positive and negative external terminals of the battery pack 200B, and the battery pack 200C, respectively.

That is, the battery packs 200A, 200B, 200C each include the positive example terminal and the negative external terminal disposed not only on the first side surface 11 of the case 10 but also on the second side surface 12 adjacent to the first side surface 11. Thus, when the battery packs 200A, 200B, 200C are electrically connected to each other in series to form the power supply unit 300, as illustrated in FIG. 6A, the second portion 52a of the electrode piece 50a disposed on the second side surface 12 of the battery module 200A may be connected to the second portion 62b of the second electrode piece 60b disposed on the second side surface 12 of the battery module 200B via the bus bar 80a, and further, the second portion 52b of the electrode piece 50b disposed on the second side surface 12 of the battery module 200B may be connected to the second portion 62c of the second electrode piece 60c disposed on the second side surface 12 of the battery module 200C via the bus bar 80b.

As described above, the external electrodes of each battery pack 200A, 200B, 200C can be disposed on the two adjacent side surfaces 11, 12 of the case 10. Thus, when the battery packs 200A, 200B, 200C are aligned to form a power supply unit, a work plane for connecting the external terminals to each other can be ensured on the two side surfaces 11, 12 of the case 10. Thus, even after the power supply unit is accommodated in a pack case, and the pack case is installed in predetermined space, maintenance, etc. can be performed with the power supply unit being in an installed state if one of the two surfaces of the pack case can be opened. Moreover, the work plane for connecting the external terminals to each other can be ensured on the two side surfaces 11, 12 of the case 10, so that it is possible to increase the degree of freedom in arranging the battery modules to form the battery pack.

Although an example in which the battery modules 100 are stacked to form the battery pack 200 has been described in FIGS. 3, 4, a battery pack formed by arranging the battery modules 100 in parallel can also provide the advantages of the invention.

Figure 7A:
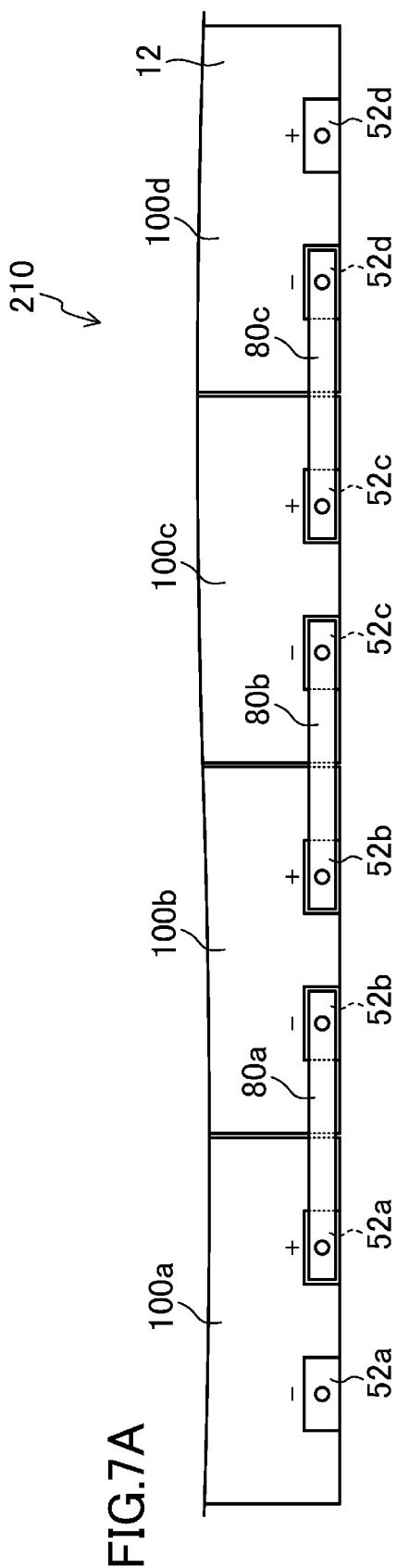
Figure 7B:
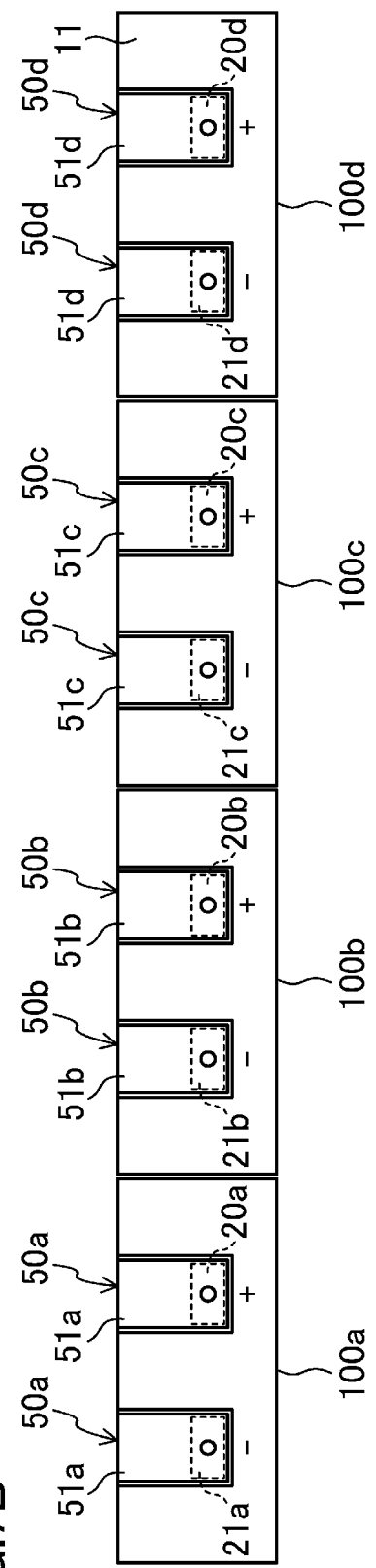

FIG. 7 is a view illustrating an example configuration of battery pack 210 formed by arranging battery modules 100a, 100b, 100c, 100d in parallel, where FIG. 7A is a plan view, and FIG. 7B is a front view.

As illustrated in FIGS. 7A, 7B, all the battery modules 100a, 100b, 100c, 100d include L-shaped electrode pieces 50a, 50b, 50c, 50d as illustrated in FIG. 1B which are attached to positive and negative external terminals 20a, 21a, 20b, 21b, 20c, 21c, 20d, 21d, and a pair of recessed sections (not shown) formed on second side surfaces 12 of cases 10. Thus, second portions 52a, 52b, 52c, 52d of the pair of electrode pieces which are formed on the second side surfaces 12 of the battery modules 100a, 100b, 100c, 100d serve as positive and negative external terminals of the battery modules 100a, 100b, 100c, 100d.

Thus, when the battery modules 100a, 100b, 100c, 100d are electrically connected to each other in series to form the battery pack 210, as illustrated in FIG. 7B, the second portions 52a and 52b, the second portions 52b and 52c, and the second portions 52c and 52d of the battery modules which are adjacent to each other may be connected via bus bars 80a, 80b, 80c on a side close to the second side surfaces 12, respectively. Of course, also on a side close to the first side surfaces 11, the positive and negative external terminals 20a and 21b, the positive and negative external terminals 20b and 21c, and the positive and negative external terminals 20c and 21d of the adjacent battery modules can be connected via bus bars (not shown).

Although the present invention has been described with reference to the preferable embodiments, the description above is not intended to limit the scope of the invention, and of course, various modifications can be made. For example, although the examples in which the battery packs 200 are electrically connected to each other in series have been described in the embodiments, the present invention can be applicable to the case where the battery packs are electrically connected in parallel. Moreover, although the examples in which electrical connection is established on the side close to the first side surface 11 or on the side close to the second side surface 12 have been described, the electrical connection can of course be established on both the sides close to the first side surface 11 and the second side surface 12.

Industrial Applicability

The present invention is useful as power sources for driving vehicles, electric motorcycles, electric play equipment, or the like.

Description of Reference Characters

10 Case
11 First Side Surface
12 Second Side Surface
20 Positive Electrode External Terminal
21 Negative Electrode External Terminal
24, 25 Bolt Hole (or Screw Hole)
26, 27 Pair of Recessed Sections (on First Side Surface)
30, 31 Pair of Recessed Sections (on Second Side Surface)
32, 33 Bolt Hole (or Screw Hole)
40 Joint
50 L-Shaped Electrode Piece
51 First Portion
52 Second Portion
53, 54 Bolt Hole (or Screw Hole)
60 Second Electrode Piece
61 First Portion
62 Second Portion
63, 64 Bolt Hole (or Screw Hole)
70a, 70b, 70c Bus Bar
80a, 80b, 80c Bus Bar
100 Battery Module
200, 210 Battery Pack
300 Power Supply Unit

The invention claimed is:
1. A battery module comprising:
a plurality of cells aligned and accommodated in a case, wherein a positive electrode external terminal and a negative electrode external terminal which are connected to electrodes of the plurality of cells are disposed in parallel on a first side surface of the case at a predetermined interval, a pair of recessed sections are formed on a second side surface adjacent to the first side surface of the case at a same interval as the predetermined interval, and a first portion of an L-shaped electrode piece is selectively attachable to the positive electrode external terminal or the negative electrode external terminal, and a second portion of the electrode piece is selectively attachable to any one of the pair of recessed sections.

2. The battery module of claim 1, wherein the second portion of the electrode piece is filled in and attached to the recessed section.

3. The battery module of claim 1, wherein the pair of recessed sections have bolt holes or screw holes for receiving a bolt or a screw, respectively, for securing the second portion of the electrode piece.

4. The battery module of claim 1, wherein a pair of second recessed sections in which the first portion of the electrode piece is filled is formed on the first side surface of the case.

5. The battery module of claim 4, wherein the pair of second recessed sections have bolt holes or screw holes for receiving a bolt or a screw, respectively, for securing the first portion of the electrode piece.

6. A battery pack comprising:

multiple ones of the battery module of claim 1 stacked in a direction perpendicular to the second side surface, wherein the first portion of the electrode piece is attached to one of the positive electrode external terminal or the negative electrode external terminal which is disposed on the first side surface of the case of the battery module at an uppermost level, the second portion of the electrode piece is attached to one of the pair of recessed sections formed on the second side surface of the case of the battery module at the uppermost level, and the second portion of the electrode piece serves as an external terminal of one of electrodes of the battery pack.

7. The battery pack of claim 6, wherein a second portion of an L-shaped second electrode piece is attached to the other of the pair of recessed sections, a first portion of the second electrode piece is connected to any one of external terminals of the battery module at a lower level via a bus bar disposed on a side close to the first side surfaces of the cases of the battery modules, and the second portion of the second electrode piece serves as an external terminal of the other of the electrodes of the battery pack.

8. The battery pack of claim 6, wherein the positive electrode external terminals and the negative electrode external terminals of the stacked battery modules are connected via a plurality of bus bars disposed on the side close to the first side surfaces of the cases of the battery modules.

9. The battery pack of claim 6, wherein neither the electrode piece nor the second electrode piece is attached to the battery module at the lower level.

10. The battery module of claim 1, wherein a first portion of the L-shaped electrode piece is exposed at the first side surface of the case, and a second portion of the L-shaped electrode piece is exposed at the second side surface of the case, and the first portion of the L-shaped electrode piece is connected to the positive external terminal or the negative external terminal, and the second portion of the L-shaped electrode piece is connected to one of the pair of recessed sections.

* * * * *